Sept. 22, 1964   W. B. McCOY   3,149,390
LINEMAN'S CLAMP
Filed Nov. 14, 1963   2 Sheets-Sheet 1

INVENTOR.
William B. McCoy
BY
Frease, Bishop, Johns & Schick
ATTORNEYS

Sept. 22, 1964  W. B. McCOY  3,149,390
LINEMAN'S CLAMP
Filed Nov. 14, 1963  2 Sheets-Sheet 2

INVENTOR.
William B. McCoy
BY
Frease, Bishop, Johns & Schick
ATTORNEYS

United States Patent Office 3,149,390
Patented Sept. 22, 1964

3,149,390
LINEMAN'S CLAMP
William B. McCoy, 100 Santa Clara Drive NW.,
Canton, Ohio
Filed Nov. 14, 1963, Ser. No. 323,797
3 Claims. (Cl. 24—262)

This invention relates to a clamp used by linemen and other maintenance personnel primarily for securing insulating personnel protective equipment on high-voltage electric conductors.

Linemen and other personnel for electric power companies frequently work within areas of close proximity with conductors carrying high-voltage electric currents. For safety reasons, it is customary to use so-called rubber goods of dielectric material such as vulcanized rubber sheets and shapes. When a lineman first enters a work area having such dangerous conditions, a lineman's protective equipment is placed over the wires or conductors and uninsulated equipment in order to minimize or completely avoid accidental contact with an otherwise uncovered equipment.

Various devices have been provided for securing the equipment in place, because a rubber protective equipment is normally heavy and susceptible to gradual slipping and dropping out of place. A clamp may be used having a pair of clamping jaws preferably composed of wood or other dielectric material with each jaw being provided with a soft rubber suction cup. Inasmuch as the jaws are normally spring-biased in a closed position, the suction cups are tightly held together. Such a clamp may be readily attached to the lineman's protective equipment for preventing the same from slipping out of the desired position.

One disadvantage of such a clamp is that an excessive amount of manual effort is normally required to open the clamp. That is particularly true where the suction cups are composed of a very pliable grade of rubber which enables the cups to create a particularly tight suction between each other or on the surface of a lineman's protective equipment. When a lineman is on a power pole with spurs, it is inconvenient to have to use both hands to open a clamp. That has been the case with most prior clamps having rubber suction cups.

It has been found that the foregoing problems may be overcome by providing a suction cup having an air-leakage aperture which is small enough to minimize the vacuum created within one cup, and thereby permit a lineman to open a clamp with only one hand.

Since linemen frequently work outside, the wind is a factor which must be contended with. For that reason, it is convenient to use the clamps at the lower ends of the overlapping blanket portions to hold the same together and prevent their blowing excessively in the wind.

Since it is often necessary to perform work on power lines at night, during rain, and under other adverse conditions, protective equipment must be provided which can be quickly applied and in a manner that will insure its proper application. One of the problems in the past has been that the interjaws of a clamp would close on or nip the protective equipment unless the clamp was placed on the equipment with considerable care which is very difficult to do under adverse working conditions. When care is not exercised a part of the equipment may be easily caught in the interjaw of the clamp which prevents the ends of the jaws from closing properly to hold the protective equpiment in place. Frequently the protective equipment is cut or otherwise damaged by that procedure. It has been found that the foregoing difficulties may be overcome by providing a guard which may be placed over the inner surface of the clamp which overlies the end and prevents accidental insertion of outside matter into the interjaw of the clamp.

In addition to the foregoing it is frequently necessary to grip a piece of protective equipment by the interface of the clamp jaws rather than by the end of the jaw where suction cups are provided. To increase the gripping action the interfaces of the jaws are lined with pads of elastic material having serrated surfaces.

Accordingly, it is an object of this invention to provide a lineman's clamp which is readily opened by the one hand.

It is another object of this invention to provide a lineman's clamp having air-leakage means in one or both suction cups to improve openability without otherwise affecting the usefulness of the clamp.

It is another object of this invention to provide a lineman's clamp having a guard across the interface of the clamp jaws to prevent accidental insertion of any object.

It is another object of this invention to provide a lineman's clamp having the intersurfaces of the clamp jaws lined with rubber-like pads to increase the gripping action of the clamp.

Finally, it is an object of this invention to provide a lineman's clamp which eliminates difficulties heretofore encountered in the art, and achieves the stated objects in a simplified and inexpensive manner.

These and other objects and advantages, apparent to those skilled in the art from the following description and claims may be obtained, the stated results achieved, and the described difficulties overcome, by the apparatus, constructions, arrangements, combinations, subcombinations, elements, parts, and principles, which comprise the present invention, the nature of which is set forth in the foregoing general statements, preferred embodiments of which—illustrative of the best mode in which applicant has contemplated applying the principles—is set forth in the following description and shown in the drawings, and which is particularly and distinctly pointed out and set forth in the appended claims forming part hereof.

The nature of the lineman's clamp of the present invention may be stated in general terms as including a pair of jaw members movable between open and closed positions, each jaw member having a pivot point corresponding with the pivot point of the other member, each jaw member having a portion engageable with the other jaw, each jaw also having a jaw handle on the side of the pivot point remote from said portion, the jaws having intermediate arcuate portions between the pivot points and the jaw-engaging portions and forming a spacing between said intermediate portions, a spring holding the jaws in pivotal engagement and holding the jaw-engaging portions closed in spring-biased contact, a suction cup on each jaw-engaging portion and in disengageable contact with a suction cup on the other said portion, and an air-leakage aperture in one of said suction cups. In the drawings:

Similar numerals refer to similar parts throughout the various views of the drawings.

Figure 1:
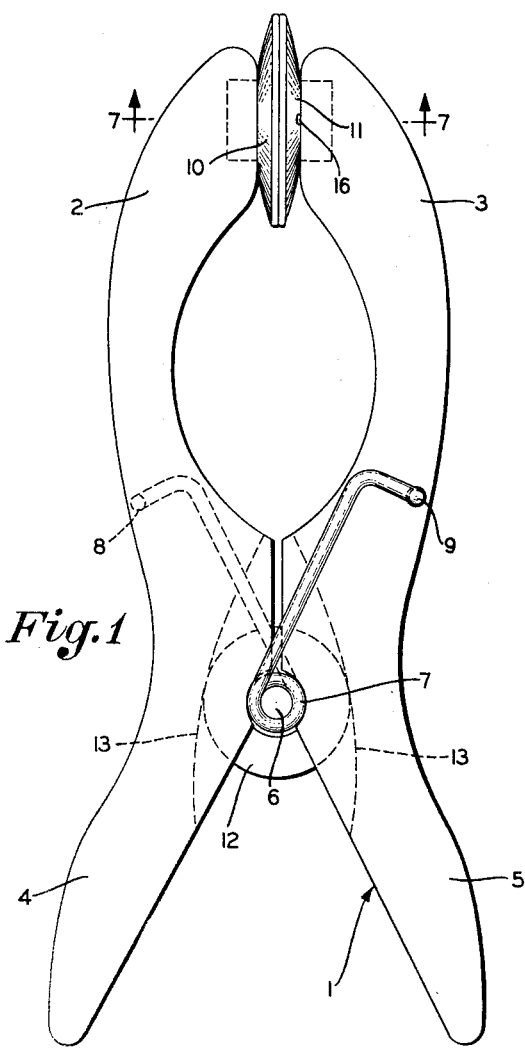
FIGURE 1 is a plan view of a clamp in the normally spring-biased closed position.

A clamp is generally indicated at 1 in FIG. 1. It includes a pair of arcuate jaws 2 and 3 having handles 4 and 5, respectively. The arcuate jaws 2 and 3 form an oval opening or clearance centrally of the clamp. The jaws 2 and 3 are pivoted about an axis 6. A coil spring 7 is mounted about the axis and between the handles 4 and 5. The spring 7 has end portions 8 and 9 which are embedded in corresponding apertures in the jaws 2 and 3 for holding the jaws normally in the closed position. In addition, each clamp is provided with a pair of rubber suction cups 10 and 11, which due to the spring 7 are held together in partial vacuum relationship as shown.

The jaw 2 and handle 4, and the jaw 3 and handle 5, are preferably composed of a dielectric material such as wood. The jaws 2 and 3 are kept in alignment by an apertured disk 12 which encircles the spring 7 and which is disposed in similar slots 13 on opposing sides of the handles 4 and 5.

Figure 7:
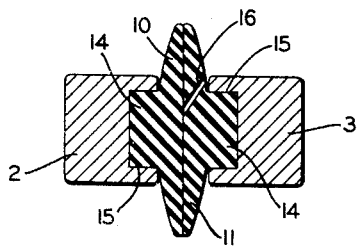
FIG. 7 is a sectional view taken on the line 7—7 of FIG. 1.

As shown more particularly in FIG. 7, each suction cup 10 and 11 is provided with a central body 14 seated in an aperture 15 in each jaw 2 and 3. The bodies 14 of the suction cups are permanently secured in place such as by an adhesive cement (not shown).

Due to the force of the spring 7 on the jaws 2 and 3, the suction cups 10 and 11 are normally held in the closed position as shown in FIG. 7. Inasmuch as the suction normally created between a pair of rubber suction cups is substantial, a lineman on an electric power pole is frequently not able to open the clamp jaws with one hand. For that reason, one of the suction cups 11 is provided with a small aperture 16 which reduces the partial vacuum between the cups 10 and 11, or between the cup 11 and the surface to which it may be attached. However, the other cup 10, having no aperture, remains operative with a partial vacuum on any surface to which it is attached.

Figure 2:
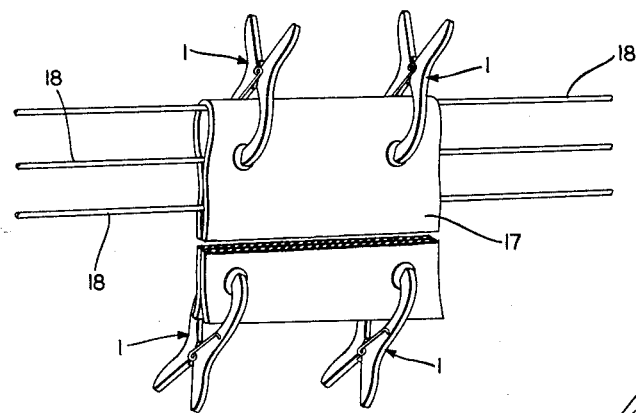
FIG. 2 is a perspective view showing the use of clamps on a lineman's blanket.
Figure 3:
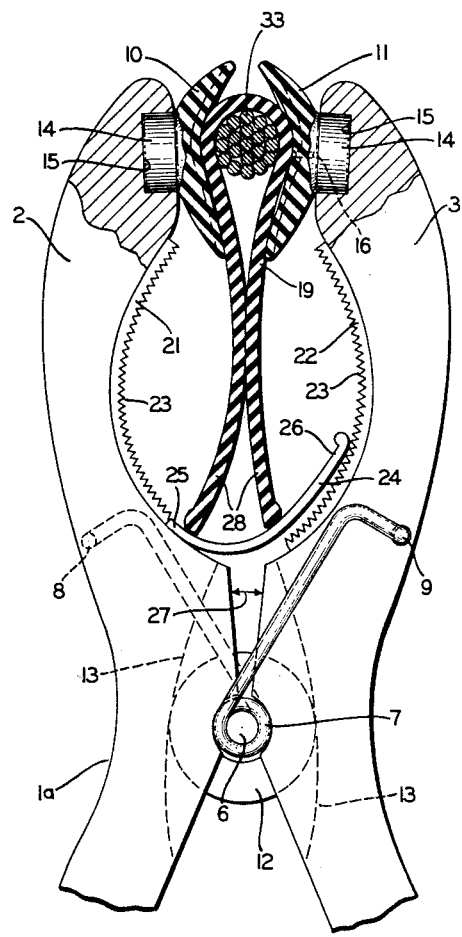
FIG. 3 is a fragmentary plan view partly in section showing the clamp holding a section of insulation on an electrical conductor.

Various uses of the clamp 1 are shown in FIG. 2. In FIG. 3 a lineman's blanket 17 is shown disposed over electric power lines 18 in order to secure the safety of a lineman who is working nearby. Due to the weight of the blanket 17, one or more clamps are provided for holding the blanket in place. The clamps may also be used at the lower ends of the blanket 17 for holding said ends together and preventing their separating due to the wind. The clamps 1 serve as anchors for the blanket and thereby increase the safety of a lineman.

Figure 4:
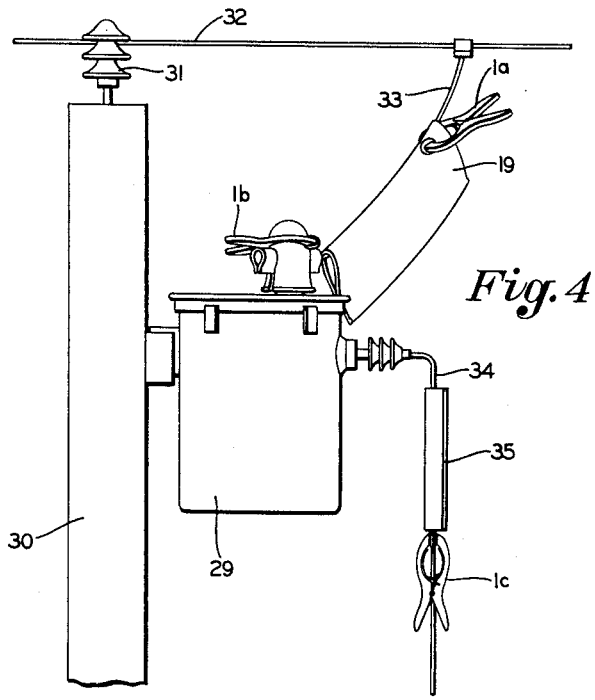
FIG. 4 is a perspective view showing the use of clamps on various types of protective equipment.

The clamps 1 may also be used for holding a sheet of insulation 19 in place on an uncovered exposed wire 33 as shown in FIG. 4. Where the diameter of the combined wire 33 and sheet 19 is sufficient, the suction cups 10 and 11 engage the outer surface of the sheet 19 in a suction-like relationship.

In most uses of the clamp 1, the pressure of the partial vacuum in two cups together with the pressure of the spring 7 is sufficient to require the use of two hands to open the clamp. The provision of the aperture 16 in the cup 11 alleviates that inconvenience and enables a lineman to open the clamp with one hand, and thereby leaves the other hand free for other activities.

Another embodiment of the invention is shown in FIGS. 3–6. It includes all the parts of the embodiment of FIG. 1 plus a pair of liners or pads 21 and 22, each mounted on the interface or facing sides of the jaws 2 and 3 where they are secured in place by an adhesive cement (not shown). The liners 21 and 22 are preferably composed of a resilient material, such as rubber, and are provided with a serrated or corrugated surface 23 to increase the gripping action of the jaws on an object.

In addition the clamp embodiment shown in FIGS. 3–6 also includes an elongated strip or guard 24 preferably composed of elastic material and having one end 25 secured to the interface of one jaw, such as by adhesive cement or the guard 24 may be an extension of the liner 21. The other end portion 26 of the guard 24 overlies the liner 22 on the jaw 3. The guard 24 extends across a breach or interjaw clearance 27 for preventing the ends 28 of a rubber blanket 19 from being inadvertently lodged in the jaw when the clamp is placed in the position shown.

As shown in FIG. 4 the clamp may be used in several different ways. A transformer 29 is mounted on a pole 30 at the upper end of which an insulator 31 is mounted for supporting a line 32. The line 33 extends from the line 32 to the upper side of the transformer 29 and a line 34 extends downwardly from the side of the transformer 29. The clamp 1 is adapted to be used in a variety of ways including a clamp 1a for securing an insulation sheet 19 on the line 33, a clamp 1b for securing a molded rubber insulation cap over an insulator (not shown) within the cap, and a clamp 1c for holding an insulation tube 35 on the line 34. The manner in which the clamp 1a is attached is shown in FIG. 3. The suction cups 10 and 11 hold an insulation blanket 19 securely in place on the wire 33.

Figure 5:
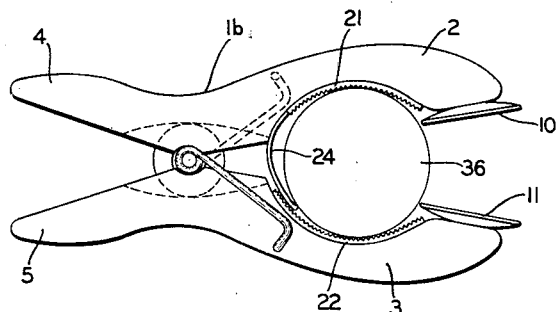
FIG. 5 is a plan view showing the manner in which the interface of the jaws engages an enlarged object.

As shown in FIG. 5 a clamp may be used on an object 36 having a size substantially greater than the maximum distance between the suction cups 10 and 11 of the open clamp. The arced portions of the jaws 2 and 3 are spaced further apart than the suction cups. Thus, the liners or pads 21 and 22 are secured in place. The grip of the clamp on the object 36 is enhanced by the serrated edges 23 of the liner. Accordingly, a greater force would be required to accidentally disengage the clamp 1b (FIG. 5) from the object 36 than would be the case where the object 36 is clamped between the suction cups 10 and 11.

Figure 6:
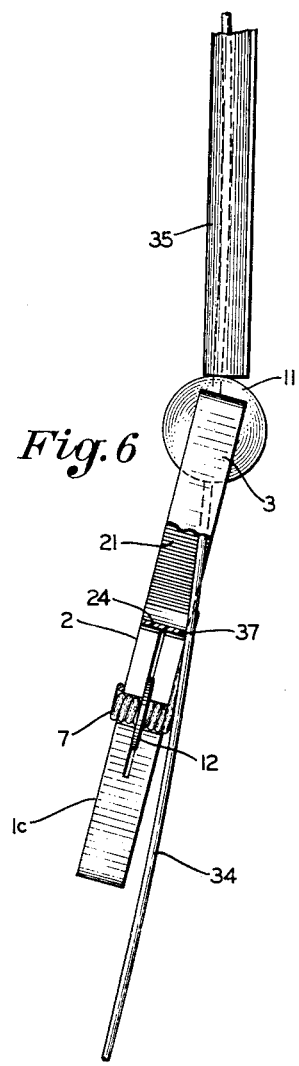
FIG. 6 is a vertical sectional view through a clamp mounted on an insulated wire for holding the protective equipment on the wire above the clamp and showing the manner in which a guard prevents the wire from entering the interjaws.

The manner in which the guard 24 operates is also shown in FIG. 6 in which a clamp 1c (FIG. 4) is mounted on the line 34 for holding the insulating tube 35 on the line. The suction cups 10 and 11 engage the line 34 below the tube 35. The line extends downwardly between the jaws 2 and 3 to a point where the line passes out of the area between the jaws. Without the guard 24 the wire 34 could be readily inadvertently clamped in the breach or interjaws clearance 27 and thereby prevent complete closing of the suction cups 10 and 11 on the upper portion of the line 34. With the guard 24 extending across the breach 27 the line 34 cannot be easily clamped in the breach or interjaw clearance 27 because the edge of the guard 24 contacts the line 34 at point of contact 37 and holds the line clear of the breach.

Accordingly, the guard 24 performs a twofold purpose of preventing inadvertent insertion of foreign objects into the breach or interjaw clearance 27 between the jaws as shown in FIGS. 3 and 6.

In the foregoing description, certain terms have been used for brevity, clearness and understanding, but no unnecessary limitations are to be implied therefrom beyond the requirements of the prior art, because such words are used for descriptive purposes herein and are intended to be broadly contrued.

Moreover, the embodiments of the improved construction illustrated and described herein are by way of example, and the scope of the present invention is not limited to the exact details of construction.

Having now described the invention, the construction, the operation and use of preferred embodiments thereof, and the advantageous new and useful results obtained thereby; the new and useful construction, and reasonable mechanical equivalents thereof obvious to those skilled in the art, are set forth in the appended claims.

What is claimed is:

1. A lineman's clamp for holding a dielectric sheet on an electric conductor, the clamp including a pair of jaw members, each jaw member having a pivot point and a portion engageable with the other jaw, each jaw also having a jaw handle on the side of the pivot point remote from said portion, a spring holding the jaws in pivotal engagement and holding said portions closed in spring-biased contact, a suction cup on each portion and in alignment with each other, and at least one of said suction cups having air-passage means therein.

2. A lineman's clamp for holding a dielectric sheet on an electric conductor, the clamp including a pair of jaw members movable between open and closed positions, each jaw member having a pivot point corresponding with the pivot point of the other member, each jaw member having a portion engageable with the other jaw, each jaw also having a jaw handle on the side of the pivot point remote from said portion, the jaws having intermediate arcuate portions between the pivot points and said portions and forming a spacing between said intermediate portions, a spring holding the jaws in pivotal engagement and holding the jaw-engaging portions closed in spring-biased contact, a suction cup on each jaw-engaging portion and in disengageable contact with a suction cup on the other jaw-engaging portion, and there being an air-leakage aperture in one of said suction cups.

3. A lineman's clamp for holding dielectric equipment on an electric conductor, the clamp including a pair of jaw members movable between open and closed positions, each jaw member having a pivot point corresponding with the pivot point of the other member, each jaw member having a portion engageable with the other portion, each jaw member having a handle on the side of the pivot point remote from said portion, the jaws having intermediate arcuate portions between the pivot points and said engageable portions and forming a spacing between said intermediate portions, a spring holding the jaws in pivotal engagement and holding the jaw-engaging portions closed in spring-biased contact, object gripping means on the jaws including an elastic liner on the surface of the arcuate portion of each jaw, and the object gripping means including an elongated guard extending across a breach between the jaws and between the arcuate portions and the pivot point.

References Cited in the file of this patent

UNITED STATES PATENTS

| | | |
|---|---|---|
| 483,628 | Hamble | Oct. 4, 1892 |
| 978,398 | Rischard | Dec. 13, 1910 |
| 1,459,582 | Dubee | June 19, 1923 |
| 1,668,513 | Millward | May 1, 1928 |
| 1,728,545 | Haushalter | Sept. 17, 1929 |
| 2,680,329 | Wigal | June 8, 1954 |
| 2,815,777 | Iraids | Dec. 10, 1957 |
| 3,041,696 | Ferri | July 3, 1962 |

FOREIGN PATENTS

| | | |
|---|---|---|
| 8,907 | Great Britain | of 1892 |
| 494,669 | Italy | May 28, 1954 |
| 91,315 | Switzerland | Oct. 17, 1921 |